(12) United States Patent
Witt et al.

(10) Patent No.: US 6,563,991 B1
(45) Date of Patent: May 13, 2003

(54) OPTICAL FIBER CABLE FOR EASY ACCESS TO RIPCORDS AND HAVING RIPCORD RELIABILITY

(75) Inventors: Geoff Witt, Hickory, NC (US); Steve Shen, Hickory, NC (US); Rick Robinson, Hickory, NC (US); J. Boyet Stevens, Maineville, OH (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/592,910

(22) Filed: Jun. 13, 2000

(51) Int. Cl.$^7$ ................................................ G02B 6/44
(52) U.S. Cl. ...................................................... 385/107
(58) Field of Search ................................ 385/107, 103, 385/112, 113, 101; 174/23 R, 70 R

(56) References Cited

U.S. PATENT DOCUMENTS

| | | |
|---|---|---|
| 4,038,489 A | 7/1977 | Stenson et al. |
| 4,707,074 A * | 11/1987 | Heywood ................. 385/96.23 |
| 5,013,127 A | 5/1991 | Bernard |
| 5,029,974 A | 7/1991 | Nilsson |
| 5,173,961 A | 12/1992 | Chiasson |
| 5,268,971 A | 12/1993 | Nilsson et al. |
| 5,384,880 A | 1/1995 | Keller et al. |
| 5,542,020 A | 7/1996 | Horska |
| 5,557,698 A | 9/1996 | Gareis et al. |
| 5,621,841 A | 4/1997 | Field |
| 5,852,698 A | 12/1998 | Bringuier |
| 5,970,196 A | 10/1999 | Greveling et al. |
| 6,088,499 A * | 7/2000 | Newton et al. ............. 385/113 |
| 6,195,486 B1 * | 2/2001 | Field et al. ................. 385/100 |
| 6,195,487 B1 * | 2/2001 | Anderson et al. ........... 385/100 |
| 6,256,438 B1 * | 7/2001 | Gimblet ...................... 385/107 |
| 6,293,081 B1 * | 9/2001 | Grulick et al. ............. 174/73.1 |

* cited by examiner

*Primary Examiner*—Lynn D. Feild
*Assistant Examiner*—Phuong Dinh
(74) *Attorney, Agent, or Firm*—Sughrue Mion, PLLC

(57) ABSTRACT

An optical fiber cable includes ripcords that are oriented in particular locations with reference to radial strength members and any armor overlap included in a housing for optical fibers. The ripcords are spaced 180° from each other and preferably 90° from the armor overlap region. Color coded or marked ripcords are also placed adjacent to RSMs, with color coding or other marking on external surfaces of the housing to indicate a pull direction for respective ripcords. The ripcords may be extruded with the RSM into a jacket housing or disposed in a grooved section formed into the RSM. Pairs of RSMs may also be disposed on opposite sides of a ripcord to protect the ripcord from being accidentally severed by cutting instruments during servicing of the cable.

21 Claims, 6 Drawing Sheets

OPTICAL FIBER CABLE FOR EASY ACCESS TO RIPCORDS AND HAVING RIPCORD RELIABILITY

BACKGROUND THE INVENTION

1. Field of Invention

The present invention relates to an optical cable having ripcords that are easily accessible, and wherein the ripcords can be used reliably without damaging the optical cable and without breakage.

2. Background of Related Art

An optical cable may include a ripcord that facilitates the removal of portions of cable armor or other protective sheathing disposed about a fiber bundle in order to gain access to the fiber bundle. However, the placement of ripcords in conventional optical cables may result in the ripcord being cut by the edge of the protective armor tape when the ripcord is used. When the ripcord becomes cut, the cable must be re-prepped, which is a time-consuming and tedious process.

Additionally, the ripcord may also be cut due to wearing against a radial strength member (RSM). This occurs when the ripcord is pulled through the wrong portion of the sheath. In such a situation, the intervening RSM may also prevent the ripcord from adequately tearing through the cable sheathing. Conventional placement of the ripcord, which permits the ripcord to be pulled incorrectly through the cable housing, may also cause damage to the fiber bundle in the central cavity of the optical cable.

Ripcords placed without due regard to the above considerations may also be accidentally cut when the cable is being prepped. Furthermore, random placement of the ripcords may not provide a sufficient window opening in the sheath, which makes it difficult to extract the cable core from its housing.

SUMMARY OF THE INVENTION

The present invention obviates the above deficiencies of known fiber cables by placing the ripcords included in the cable armor with reference to the position of the cable armor overlap and also with reference to radial strength members included in the cable. In particular, ripcords are placed at least 45 degrees, preferably 90 degrees ±20 degrees, off the center from the armor tape overlap. With regard to ripcord placement relative to a radial strength member, the ripcord can be extruded into the cable jacket along with the radial strength members. The ripcords are placed anywhere on the 270 degree arc, centered toward the cable cavity, around each RSM. In this manner, the position of the ripcords will not shift, and their position near the RSM mitigates the risk of age due to a service technician's misplaced cut. The cable and ripcords can also be marked by color coding, texturing or printed matter so that the ripcord is pulled in the correct direction to avoid being damaged by the RSM.

Preferred embodiments of the invention with be described below with reference to the attached drawings where:

DESCRIPTION OF PREFERRED EMBODIMENTS

Figure 1:
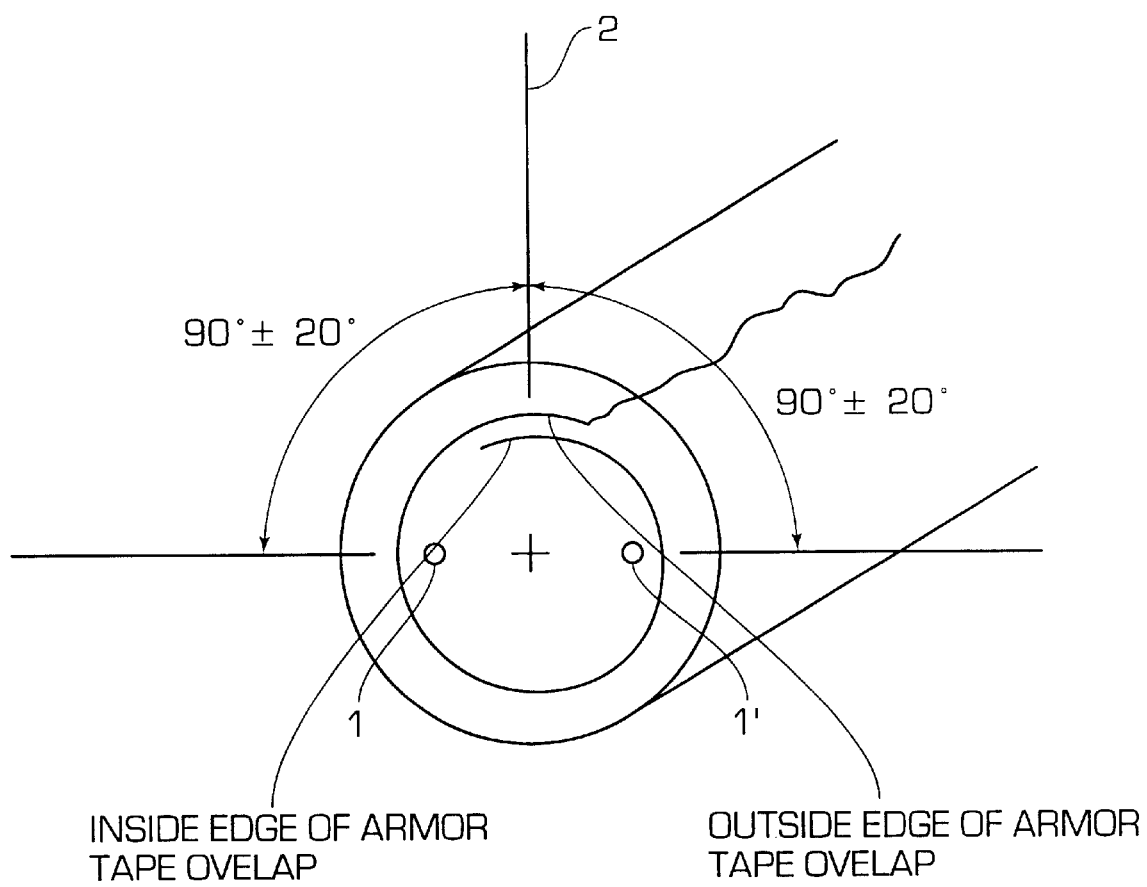
FIG. 1 illustrates an optical cable with ripcords according to a first embodiment of the invention.

Referring to FIG. 1, the ripcords 1, 1' are disposed at 90°±20° relative to the center of armor tape overlap 2. The reason for this is that each of the edges of the corrugated armor tape is like a serrated knife. If the ripcord rubs against this edge as it is being used to cut through the sheath, the ripcord will be cut and the cable must be re-prepped. Ripcords should be 180 degrees apart in order to provide a bisected cable sheath that permits the fiber core to be most easily extracted. Accordingly, to provide the bisected sheath, the best position that the ripcords can be from the armor overlap is 90 degrees. To provide this degree of ripcord displacement relative to the center tape and relative to the other ripcord, the ripcords can simply be guided into this position during cable manufacturing or the ripcords can be glued to the armor tape at the appropriate angular displacement from the armor overlap, using an appropriate adhesive.

Figure 2A:
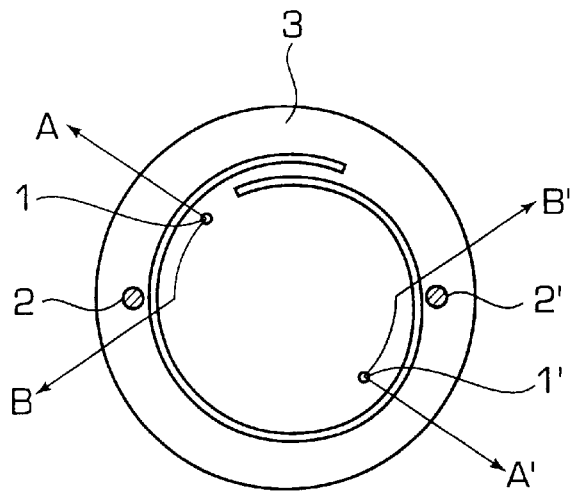
FIG. 2 illustrates an optical cable with ripcords according to a second embodiment of the invention.
Figure 2B:
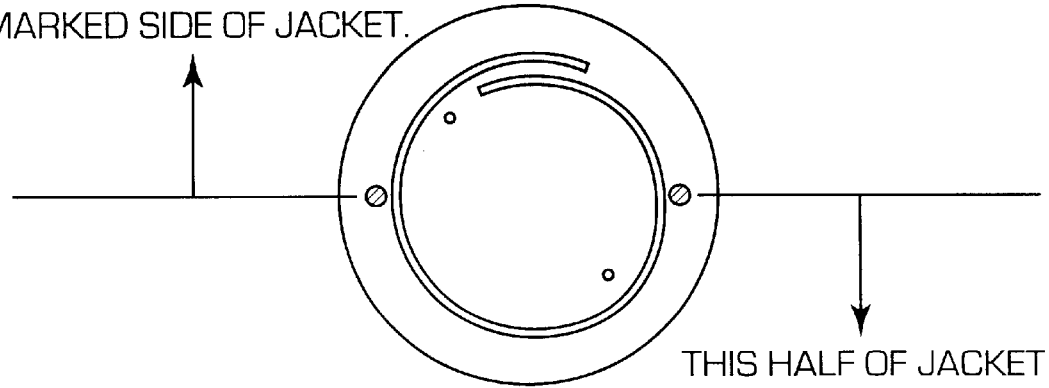

Referring to FIG. 2A, the placement of the ripcords 1, 1' relative to reinforcing radial strength members 2, 2' disposed in an optical cable should also be considered, in addition to their replacement relative to the armor overlap 3. In an optical cable including the RSMs, ideally ripcord 1 should be pulled in direction A through jacket 4 and ripcord 1' should be pulled in direction A'. However, without adequate indicators, a service person may pull ripcord 1 in direction B or ripcord 1' in the direction of B'. Either situation could cause the ripcord to break due to the shearing action against the RSM 2 or 2'. Accordingly, as a further feature of the invention, when the ripcords and RSMs are disposed as shown in FIG. 2B, the ripcords and one or more sides of the cable sheath are color coded so that each ripcord can be identified and pulled through the corresponding side of the cable sheath. The color coding or other marking, such as texturing or printing, is provided to orient the ripcord with the appropriate side of the cylindrical jacket with respect to the RSMs. This can be done whether or not the cable includes an armor overlap or not, such as in the case of a dielectric cable.

Figure 3:
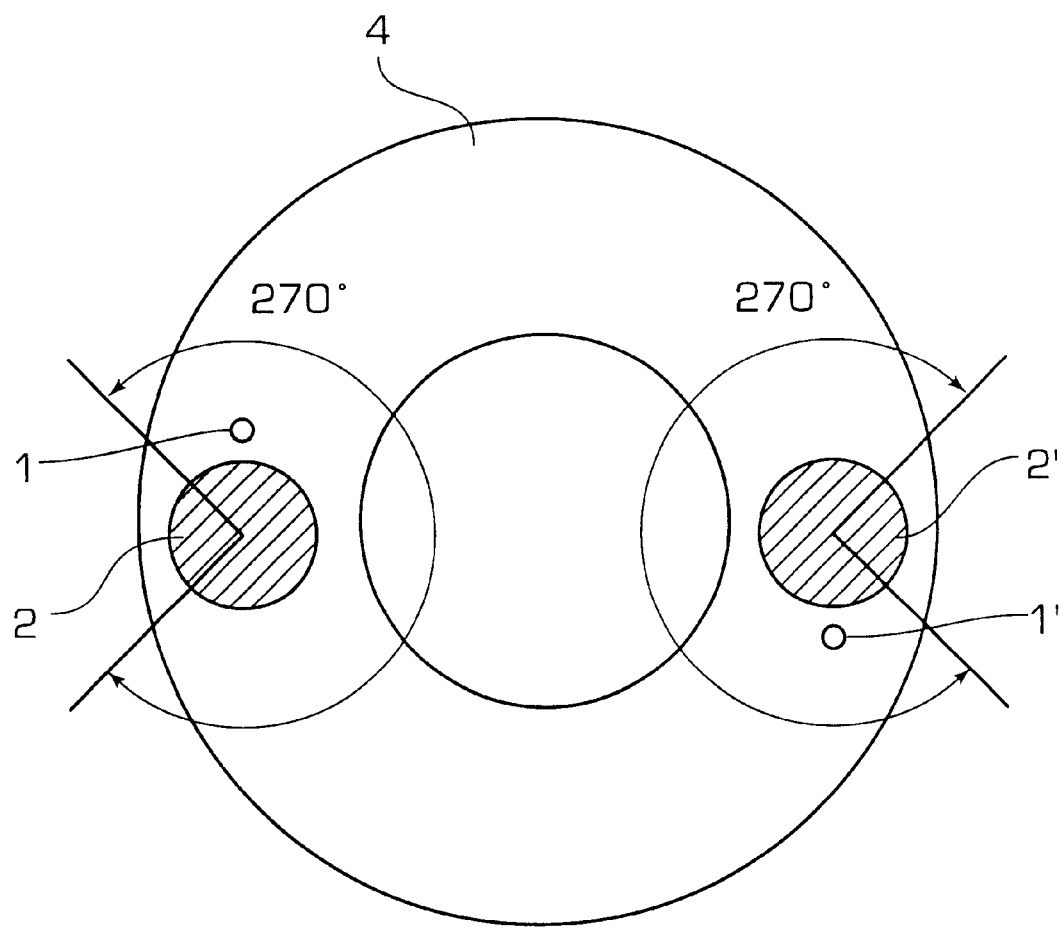
FIG. 3 illustrates an optical cable with ripcords according to a third embodiment of the invention.

Referring to FIG. 3, the ripcords 1, 1' are extruded into the cable jacket 4 along with the radial strength members 2, 2'. The ripcords are placed anywhere on the 270 degree arc, centered toward the cable cavity, around each RSM. When the ripcords are placed in this region, the jacket over each RSM can be completely cut away without risk of cutting the ripcords, thereby reducing the need of having to re-prep the cable. Note that once the jacket is cut away from the RSM, the jacket can be torn in half axially, allowing access to the ripcords.

In order to place the ripcords along the RSMs, they must pass through the jacket tooling with the RSM. This will ensure that the ripcords are aligned roughly 180 degrees apart to bisect the cable sheath to permit easy access to the cable core when the ripcords are used.

The thin layer of sheath material between the cable cavity and the ripcords acts as a barrier so that the ripcords cannot impinge on fibers/fiber bundles in the cavity when the ripcords are used. Note that the ripcord is used to cut through the majority of the jacket wall thickness. The remaining layer of the jacket will be thin enough to tear by hand.

Figure 4:
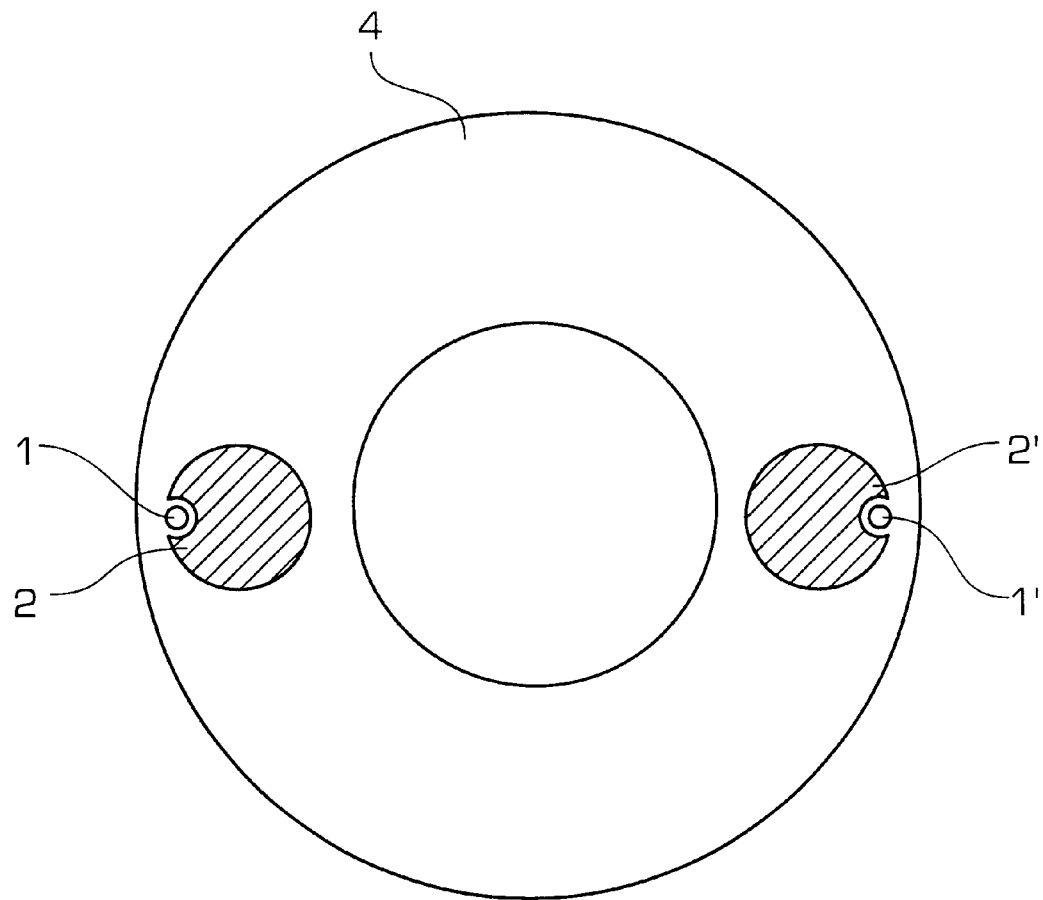
FIG. 4 illustrates an optical cable with ripcords according to a fourth embodiment of the invention.

Referring to FIG. 4, as an alternative way to prevent the ripcords 1, 1' from being cut by hand tools during servicing, the RSM 2, 2' can be manufactured with an axial groove where a ripcord can be placed. The ripcord can be easily accessed by shaving the jacket 3 from over the RSM with a knife. Since the ripcord is recessed in the RSM, the ripcord will be protected from the blade. Due to the nature of materials typically used for the jacket and the RSM, it is easy to cut the jacket from the RSM without cutting into the RSM. In this embodiment, the ripcords will be roughly 180 degrees apart because a jacketing tool holds the RSMs in this position. The orientation of the groove formed in the RSM is preferably along the 180 degree arc directed away from the center of the cable.

Figure 5:
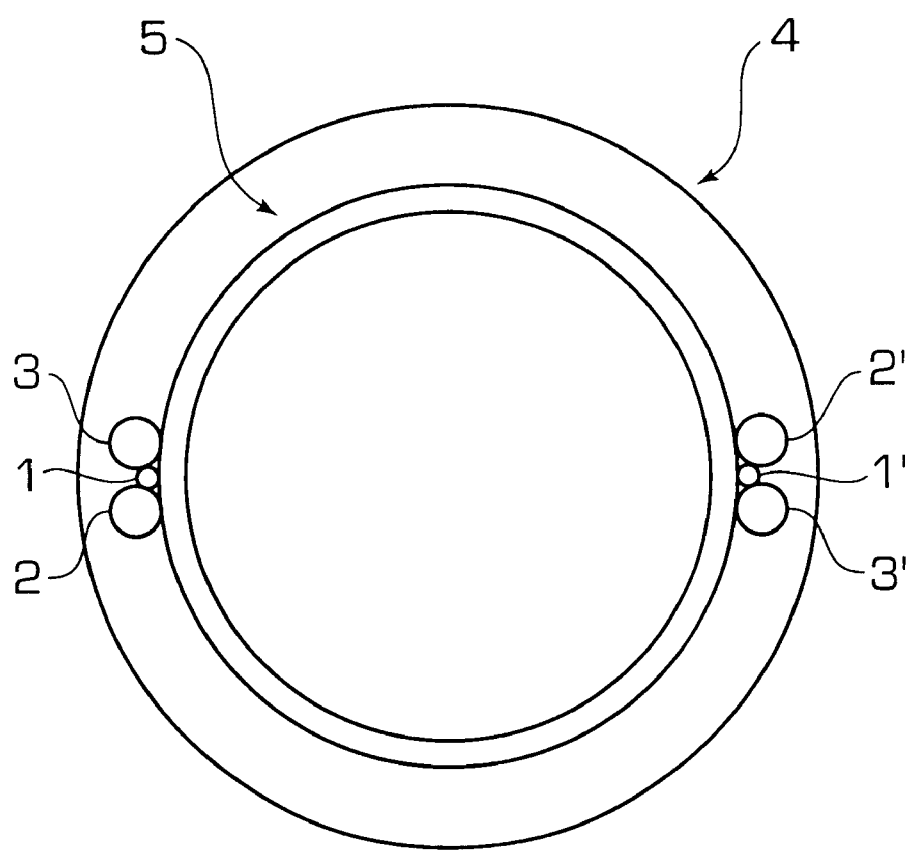
FIG. 5 illustrates an optical cable with ripcords according to a fifth embodiment of the invention.

Referring to FIG. 5, a pair of RSMs 2, 3 and 2', 3' can be disposed on either side of respective ripcords 1 and 1'. The RSMs and ripcords are disposed external to a buffer tube 5. In this embodiment, the jacket 4 is shaved away with a knife to access the ripcords. The radial strength members protect the ripcords from cutting implements and can also be used to guide the ripcords during manufacturing. In the exemplary case, the ripcords are spaced 180 degrees apart from each other.

Figure 6:
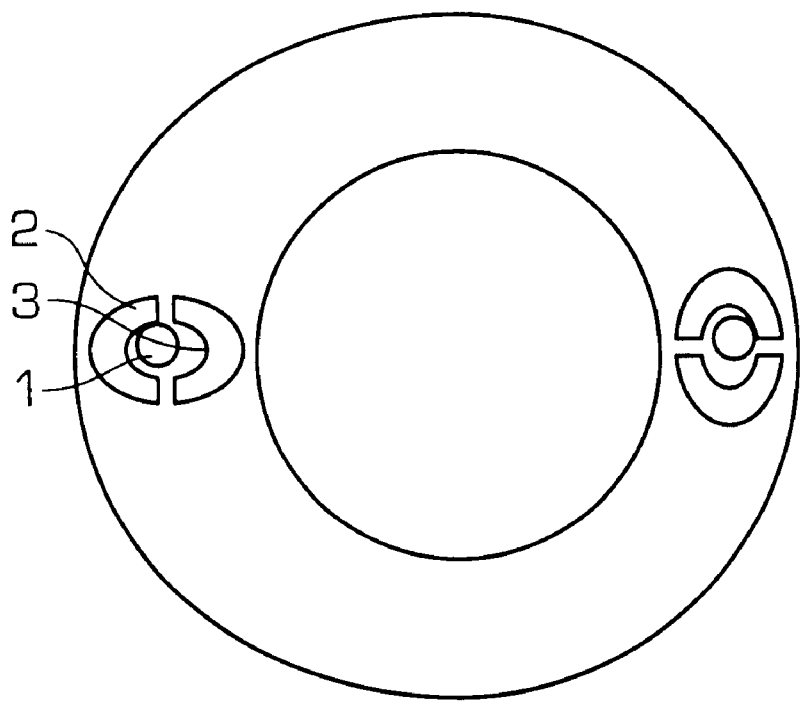
FIG. 6 illustrates an optical cable with ripcords according to a sixth embodiment of the invention.

FIG. 6 illustrates a further feature of the invention whereby the radial strength elements 2, 3 and 2', 3' are formed by curved channels including respective concave portions. The ripcords are disposed within the concave portions of each pair of radial strength elements to guard against their being severed by a cutting instrument. Though concave recesses are shown, the cross-sectional shape of the radial strength members is not limited thereto, and any cross-sectional shape that includes a recessed portion may be used to protect the ripcords.

In each of the embodiments of FIGS. 3–6, there is no risk of damaging the fibers or fiber bundles in the cable cavity since the RSMs act as barriers between the ripcords and the central cavity. Note that the ripcords are used to cut through most of the jacket wall So thickness. The thin layer of jacket between the RSMs and the cable cavity can be torn by hand.

Although preferred embodiments of the invention have been described in detail above, the invention is not limited thereto as one skilled in the art could modify the specific disclosures without departing from the scope and spirit of the invention.

What is claimed is:

1. An optical fiber cable comprising:
   an armor layer disposed in a cylindrical form, said armor layer including a first end and a second end, the first end overlapping said second end at an overlap point;
   a first and a second ripcord disposed approximately 180 degrees from each other within the cylindrical form of said armor layer, each of said first and second ripcords disposed more than approximately 45 degrees from said overlap point within the cylindrical form.

2. The optical fiber cable of claim 1, wherein each of said first and second ripcords is disposed approximately 90 degrees from said overlap point.

3. The optical fiber cable of claim 2, wherein said first and second ripcords are fixedly attached to the armor layer to prevent movement within the cylindrical form.

4. The optical fiber cable of claim 3, wherein said first and second ripcords are adhered to the armor layer.

5. The optical fiber cable of claim 1 further comprising first and second radial strength members, said first and second radial strength members disposed more than approximately 45 degrees from said overlap point, wherein said first ripcord is positioned at a location proximate to said first radial strength member and towards said overlap point and said second ripcord is positioned at a location proximate to said second radial strength member and located in a direction away from said overlap point.

6. The optical fiber cable according to claim 5 further comprising a jacket, wherein one of said first and second ripcords is marked by at least one of printing and texturing and when said first ripcord is marked, an external surface of a first portion of said jacket is marked, and when said second ripcord is marked, an external surface of a second portion of said jacket is marked.

7. The optical fiber cable according to claim 6, wherein said first portion that is marked when said first ripcord is marked comprises that external surface of the jacket which is within approximately ±90° from said overlap point and wherein said second portion that is marked comprises that external surface of the jacket which is more than ±90° from said overlap point.

8. An optical fiber cable comprising:
   a jacket housing disposed in a cylindrical form;
   first and second radial strength members disposed in said jacket housing spaced approximately 180° from each other, said first and second radial strength members defining a reference line;
   a first ripcord disposed adjacent to said first radial strength member,
   a second ripcord disposed adjacent to said second radial strength member;
   wherein said first and second ripcords are placed along an approximately 270° arc along respective first and second radial strength members, wherein each respective arc is defined by a center point of each respective radial strength member, and wherein a first boundary of each respective arc is offset approximately +45 degrees from said reference line and a second boundary of each respective arc is offset approximately –45 degrees from said reference line, said arc subtending an area towards a longitudinal axis of the cylindrical form.

9. The optical fiber cable of claim 8, wherein said first and second ripcords are placed along an approximately 180° arc along respective first and second radial strength members directed towards a central portion of said cylindrical form.

10. The optical fiber cable of claim 8, wherein said first and second ripcords are disposed in said jacket housing.

11. The optical fiber cable of claim 9, wherein said first and second ripcords are disposed in said jacket housing.

12. The optical fiber cable of claim 8, wherein said first ripcord is extruded with said first radial strength member into said jacket housing.

13. The optical fiber cable of claim 9, wherein said first ripcord is extruded with said first radial strength member into said jacket housing.

14. An optical fiber cable comprising:
   a first radial strength member formed with a groove; and
   a first ripcord disposed in said groove.

15. The optical fiber cable of claim 14 further comprising:
   a jacket housing disposed in a cylindrical form;
   a second radial strength member formed with a groove spaced approximately 180° in said jacket housing from said first radial strength member; and
   a second ripcord disposed in the groove of said second radial strength member.

16. The optical fiber cable of claim 15, wherein the grooves of said first and second radial strength members are oriented along an approximately 180° arc directed away from a central portion of the cylindrical form formed by said jacket housing.

17. An optical fiber comprising:

a first radial strength member and a second radial strength member disposed in a cylindrical form and disposed approximately 180° from each other to bisect the cylindrical form into a first half and a second half;

a first ripcord disposed in the first half of the cylindrical form and a second ripcord disposed in the second half of the cylindrical form; and a jacket, wherein said jacket includes an external surface divided into a first portion and a second portion corresponding to the first and second halves of the cylindrical form, respectively;

wherein one of said first and second ripcords is marked by at least one of printing, color coding, and texturing, and one of said first and second portions of said jacket is marked by at least one of printing, color coding and texturing, such that when said said first portion of the jacket is marked, said first ripcord disposed in said first half of the cylindrical form is marked and when said second portion of the jacket is marked, said second ripcord disposed in said second half on the cylindrical form is marked.

18. An optical fiber comprising:

a first radial strength member pair including first and second radial strength elements disposed about a first ripcord;

a second radial strength member pair including third and fourth radial strength elements disposed about a second ripcord, said first and second radial strength member pairs disposed within a cylindrical form, wherein said first through fourth radial strength elements comprise members having a recessed portion, wherein the recessed portions of the first and second radial strength elements are disposed to face each other and said first ripcord is disposed within the recessed portions of said first and second radial strength elements, and wherein the recessed portions of said third and fourth radial strength elements are disposed to face each other and said second ripcord is disposed within the recessed portions of said third and fourth radial strength elements.

19. An optical fiber comprising:

an armor layer disposed in a cylindrical form, said armor layer including a first and a second end, the first end overlapping the second end at an overlap point;

a first and a second ripcord disposed within the cylindrical form of the armor layer, each of the first and second ripcords disposed more than 45 degrees from said overlap point within the cylindrical form.

20. An optical fiber comprising:

a jacket housing disposed in a cylindrical form;

a radial strength member disposed in said jacket housing, said radial strength member and a center point of a cross section of the cylindrical form defining a reference line;

a ripcord disposed adjacent to said radial strength member, wherein said ripcord is placed along an approximately 270 degree arc along the radial strength member, wherein said arc is defined by a center point of the radial strength member, and wherein a first boundary of said arc is offset approximately +45 degrees from said reference line and a second boundary of said arc is offset approximately −45 degrees from said reference line, said arc subtending an area towards a the center point of the cylindrical form.

21. An optical fiber comprising:

a first radial strength member pair including first and second radial strength elements disposed about a first ripcord;

a second radial strength member pair including third and fourth radial strength elements disposed about a second ripcord, said first and second radial strength member pairs disposed within a cylindrical form, wherein a cross section of the optical cable includes a center point of the cylindrical form, and four strength member center points corresponding to center points of respective first through fourth radial strength members, and two ripcord center points corresponding to center points of respective first and second ripcords, wherein a first distance between the center point of the cylindrical form and any of the four strength member center points is longer than a second distance between the center point of the cylindrical form and any of the two ripcord center points.

* * * * *